United States Patent Office 3,655,830
Patented Apr. 11, 1972

3,655,830
COMPATIBLE MIXTURES OF METHYL METHACRYLATE POLYMER AND HIGH MOLECULAR WEIGHT ETHYLENE OXIDE POLYMER
Terry Edward Smith, Norwalk, Conn., assignor to American Cyanamid Company, Stamford, Conn.
No Drawing. Filed Nov. 18, 1969, Ser. No. 877,876
Int. Cl. C08f 29/50, 37/18
U.S. Cl. 260—901
4 Claims

ABSTRACT OF THE DISCLOSURE

Compositions of matter comprising polymers of methyl methacrylate having blended therewith from about 10% to about 30%, by weight, based on the total weight of the mixture, of a polymer of ethylene oxide having a molecular weight of at least about 50,000, are disclosed.

BACKGROUND OF THE INVENTION

This invention relates to compositions of matter comprising a physical blend of a methyl methacrylate polymer and an ethylene oxide polymer. The blending of various resin systems with one another has been carried out for many years. Many such resin systems have been blended with one another to give compositions combining the excellent characteristics of each into the blend. Arcylic polymers, however, are somewhat difficult to so modify due to the fact that many resin systems are not molecularly compatible therewith. As a result, blends produced from acrylic polymers and other polymers suffer from deficiencies such as opacity, low impact strength, etc. Additionally, attempts to modify acrylic polymers with plasticizers, such as for example phthalates, result in the production of soft, weak materials which are, for the most part, useless in commercial applications. It was, therefore, the previous practice to copolymerize the acrylic monomer with a sufficient amount of at least one comonomer copolymerizable therewith in order to produce a product having useful and improved properties.

The use of low molecular weight ethylene oxide polymers i.e. those having molecular weights of approximately 1000–2000, as modifiers for, or as blends with, methyl methacrylate polymers has been the subject of various patents. See, for instance, U.S. Pat. No. 3,110,695.

These low molecular weight ethylene oxide polymer blends, although moderately good plasticizers for methyl methacrylate polymers, do not remain blended therewith over a period of time. That is to say, after a few months, the ethylene oxide polymers exude out of the methyl methacrylate polymer, thereby rendering the composition useless. Furthermore, the impact strength of blends of the low molecular weight ethylene oxide polymers and methylmethacrylate polymers are very low and therefore prevent their usage in many applications where impact strength is a necessity.

SUMMARY

I have now discovered that ethylene oxide polymers having molecular weights of at least about 50,000 can be blended with methyl methacrylate polymers to produce optically clear, high impact compositions which also have a high elongation at break, good anti-static properties and greater wetability than previously known compositions of this type. These unique properties are apparently achieved because the two resin systems are molecularly compatible, a result which is surprising and unexpected in view of the prior art discussions of known blends mentioned above and especially since it is generally believed that an increase in molecular weight of a particular polymer will decrease the compatibility thereof with other polymers with which it is blended.

My novel compositions contain from about 10% to about 30% of the ethylene oxide polymer, which range is critical in order to obtain the above-discussed properties of the ultimate compositions. Higher concentrations are compatible at elevated temperatures, but at room temperature the ethylene oxide polymer crystallizes, causing the mixtures to become translucent or opaque. The fact that transparent compositions are obtained in my novel composition is unique in that the ethylene oxide polymers themselves are translucent to opaque because of a high degree of crystallinity. The ethylene oxide polymers also function as permanent plasticizers for the methyl methacrylate polymers, the additive not exuding out or otherwise separating from the polymers to which it is added as with low molecular weight materials especially at higher concentrations.

My novel compositions possess the ability to be molded into various articles of manufacture which are transparent and have a high impact strength. Such characteristics have previously been produced by exacting and tedious methods of preparation wherein such techniques as the matching of refractive indices and other critical manipulative treatments were necessary.

DESCRIPTION OF THE INVENTION INCLUDING PREFERRED EMBODIMENTS

As mentioned above, my novel compositions comprise a physical blend of a polymer of methyl methacrylate, having dispersed throughout the body thereof, from about 10% to about 30%, by weight, based on the weight of said blend, of a polymer of ethylene oxide having a molecular weight of at least about 50,000. The polymers are compatible at lower concentrations but the resultant blends do not possess the unique characteristics mentioned above.

The polymers of methyl methacrylate which may be utilized to produce my novel compositions include methyl methacrylate homopolymer and copolymers thereof, in amounts up to about 40%, with such comonomers as the unsaturated alcohol esters, more particularly the allyl, vinyl, butenyl, etc., esters of saturated and unsaturated aliphatic and aromatic monobasic and polybasic acids such, for instance, as acetic, propionic, crotonic, oxalic, malonic, succinic, adipic, maleic, fumaric, itaconic, benzoic, phthalic, etc., acids; the saturated monohydric alcohol esters, e.g., the methyl, ethyl, propyl, etc., esters of ethylenically unsaturated aliphatic monobasic and polybasic acids, illustrative examples of which appear above; unsaturated ethers, e.g., ethyl vinyl ether, diallyl ether, etc.; unsaturated amides, for instance, acrylamide and N-substituted acrylamides, e.g., N-methylol acrylamide, unsaturated ketones, e.g., methyl vinyl ketone etc.; ethylene; acrylates such as methyl acrylate, ethyl acrylate, etc.; vinyl halides, such as vinyl chloride, including vinylidene halides such as vinylidene chloride, vinylidene fluoride and the like.

Among the comonomers which are preferred for use in carrying my invention into effect are, for example, compounds such as acrylonitrile; the various substituted acrylonitriles (e.g., methacrylonitrile, ethacrylonitrile, phenylacrylonitrile, etc.), vinyl cyclic compounds (including monovinyl aromatic hydrocarbons), e.g., styrene, o-, m-, and p-chlorostyrenes, -bromostyrenes, -fluorostyrenes, -methylstyrene, -ethylstyrene, the various poly-substituted styrenes such, for example, as the various di-, tri-, and tetra - chlorostyrenes, -bromostyrenes, -fluorostyrenes, -methylstyrenes, -ethylstyrenes, etc.; vinyl naphthalene, vinyl pyridine, divinyl benzene, trivinyl benzene, allyl benzene, diallyl benzene, etc.

Other monomers copolymerizable with the alkyl methacrylates are given, for instance, in U.S. Pat. No. 2,601,-572, dated June 24, 1952, where examples are given both by classes and species, said patent hereby being incorporated herein by reference.

The ethylene oxide polymers which may be utilized to produce my novel compositions are well known in the art as are methods for their production. They include polyethylene oxide, which may be utilized per se, and copolymers of ethylene oxide, in amounts up to about 40%, of such non-halogenated epoxy comonomers as propylene oxide, butene oxides, 2,3-epoxybutane, 1,2-epoxybutane, cyclohexene oxide, vinyl cyclohexene oxide, 3,4-epoxycyclohexane carbonitrile, 1-hexene oxide, styrene oxide, 1,2-epoxyhexadecane, butadiene, maleic anhydride etc., appended claims. All parts and percentages are by weight unless otherwise specified.

Example 1

To a two roll mill are added 75 parts of a copolymer of methyl methacrylate and ethyl acrylate (95/5) and 25 parts of polyethylene oxide having a weight average molecular weight of about 3,000,000. The two resins are blended together at 175° C. for about 5 minutes. The resultant composition is then recovered and molded into test specimens, the properties of which are set forth in Table I, below.

TABLE I

| Composition | Izod impact (f.p.p.i.) | Reverse notched Izod impact (f.p.p.i.) | Tensile impact (f.p.-in.$^2$) | Elongation at break, percent | Characteristics |
| --- | --- | --- | --- | --- | --- |
| That of Example 1 | 0.40 | 6.4 | 23.0 | 20.0 | Transparent—remains compatible after two months. |
| Blend of methyl methacrylate copolymer of Ex. 1 with polymethylene oxide having molecularp weight of 1,450. | 0.35 | 4.0 | | | Transparent—evidence of exuding out of the ethylene oxide polymer. |
| Methyl methacrylate copolymer of Examle 1 | 0.34 | 3.8 | 15.0 | 7.0 | Transparent. |
| Blend of methyl methacrylate copolymer of Ex. 1 with polyethylene oxide having molecular weight of 90,000. | 0.38 | 5.8 | 21.5 | 18.0 | Transparent—no evidence of exuding after 3 months. | see U.S. Pat. Nos. 2,987,489; 3,041,291; 3,077,467, hereby incorporated herein by reference. Additionally, graft and block copolymers of polyethylene oxide and any of the above comonomers set forth in regard to the methyl methacrylate polymers and the ethylene oxide polymers may be used.

The polymer components may be blended with one another by any known technique in the form of solids, solutions, and the like. For example, blending may be effected by the use of rubber mills, Banbury mixers, sigma mixers, hot rolls, extruders and the like when they are in the form of melts. The materials may be blended together in the form of solution in such solvents as benzene, methylene chloride and the like.

Additionally, my novel compositions can be prepared by the polymerization of the monomers used to produce one of the components in the presence of the other polymeric component. For example, methyl methacrylate can be polymerized, under known polymerizing conditions, such as at 100° in the presence of a free-radical generating catalyst i.e. azobisisobutyronitrile and the ethylene oxide polymer, to produce my novel compositions.

As mentioned above, it is critical that the ethylene oxide polymer have a molecular weight of at least about 50,000, as determined by the light scattering method. I have found that the use of polymers of ethylene oxide having molecular weights substantially below 50,000 do not result in the ultimate compositions having the unique combination of above-enumerated properties i.e. permanent compatibility, high impact strength, elongation etc. when blended with the methyl methacrylate polymers. The molecular weights of the methyl methacrylate polymers are not critical; however, it is preferred that polymers having a molecular weight of over about 100,000 be utilized.

The compositions of the instant invention may be modified by the addition thereto of dyes, pigments, stabilizers, inhibitors, fillers, antioxidants and photochromic materials in concentrations known to those skilled in the art, without detracting from the scope of the instant invention.

As suggested above, my novel compositions may be utilized as surface coatings for decorative laminates, molding compositions or additives useful for modifying the properties of other resin systems.

The following examples are set forth for purposes of illustration only and are not to be construed as limitations on the instant invention except as set forth in the Example 2

To a suitable casting cell composed of glass plates are added 80 parts of methyl methacrylate and 20 parts of polyethylene oxide having a molecular weight of about 3,000,000. The resultant blend is cast between the glass plates at 70° C. in the presence of 0.080%, based on the weight of said methyl methacrylate, of azobisisobutyronitrile and cured at 50° C. for 18 hours, 60° C. for 1 hour, 70° C. for 1 hour and 100° C. for 1 hour. The resultant cast sheet is transparent, has an Izod impact strength of 0.39 f.p.p.i. and does not indicate evidence of extruding out of polyethylene oxide after 6 months.

Example 3

Following the procedure of Example 1 except that 90 parts of said methyl methacrylate polymer and 10 parts of said polyethylene oxide are employed, a composition is recovered which, when formed into test specimens, has an Izod impact strength of 0.37 and an elongation of 7.2%. The composition is transparent and does not evidence any exuding out of polyethylene oxide after 2 months.

When the procedure of Example 1 was again followed except that the methyl methacrylate polymer was modified such that in the first instance the ethyl acrylate was replaced by 40% of ethyl methacrylate, in the second instance by 20% of styrene and in the third instance by 5% of methacrylonitrile, compositions exhibiting substantially equivalent characteristics and properties were recovered.

Similar results were observed when the polyethylene oxide was modified in such a manner so as to produce (1) a copolymer containing 10% of propylene oxide, (2) a copolymer containing 40% of 2,3-epoxybutane and (3) a block copolymer of polyethylene oxide and vinylidene fluoride and each copolymer was blended with the methyl methacrylate polymer of Example 1.

We claim:
1. A composition of matter consisting essentially of a compatible physical mixture of (1) from about 70% to about 90%, by weight, of a polymer of methyl methacrylate containing at least about 60%, by weight, methyl methacrylate and (2) from about 10% to about 30%, by weight, said percentages being based on the total weight of the mixture, the total of (1) and (2) being 100%, of a polymer of ethylene oxide containing at least 60%, by weight, of ethylene oxide, the remaining being a comonomer selected from the group consisting of ethylenically unsaturated monomers and non-halogenated epoxy monomers, said polymer of ethylene oxide having a molecular weight of at least about 50,000.

2. A composition according to claim 1 wherein said ethylene oxide polymer is polyethylene oxide.

3. A composition according to claim 1 wherein said methyl methacrylate polymer is poly(methyl methacrylate).

4. A composition according to claim 1 wherein said methyl methacrylate polymer is poly(methyl methacrylate) and said ethylene oxide polymer is polyethylene oxide.

References Cited
UNITED STATES PATENTS

| | | | |
|---|---|---|---|
| 3,110,695 | 11/1963 | Ceresa | 260—45.5 |
| 3,475,519 | 10/1969 | Noland et al. | 260—901 |
| 3,483,135 | 12/1969 | Hsieh | 252—431 |

MURRAY TILLMAN, Primary Examiner

J. SEIBERT, Assistant Examiner

U.S. Cl. X.R.

260—876 R, 876 B, 879, 881, 884, 885, 887, 898, 899, 900